United States Patent
Luo

(10) Patent No.: US 11,288,335 B2
(45) Date of Patent: Mar. 29, 2022

(54) METHOD FOR SEARCH RESOURCE RECOMMENDATION AND SMART DEVICE

(71) Applicant: SHENZHEN HEYTAP TECHNOLOGY CORP., LTD., Guangdong (CN)

(72) Inventor: Yue Luo, Guangdong (CN)

(73) Assignee: SHENZHEN HEYTAP TECHNOLOGY CORP., LTD., Shenzhen (CN)

(*) Notice: Subject to any disclaimer, the term of this patent is extended or adjusted under 35 U.S.C. 154(b) by 177 days.

(21) Appl. No.: 16/797,160

(22) Filed: Feb. 21, 2020

(65) Prior Publication Data

US 2020/0192960 A1   Jun. 18, 2020

Related U.S. Application Data

(63) Continuation of application No. PCT/CN2017/100082, filed on Aug. 31, 2017.

(51) Int. Cl.
*G06F 16/00* (2019.01)
*G06F 16/9537* (2019.01)
*G06F 16/29* (2019.01)

(52) U.S. Cl.
CPC .......... *G06F 16/9537* (2019.01); *G06F 16/29* (2019.01)

(58) Field of Classification Search
CPC .. G06F 16/9537; G06F 16/29; G06F 2201/81; G06F 2201/875; G06F 2201/88;
(Continued)

(56) References Cited

U.S. PATENT DOCUMENTS

| 7,330,846 B1 | 2/2008 | Dirisala et al. |
| 9,170,849 B2 * | 10/2015 | Calder ............ G06F 9/5088 |

(Continued)

FOREIGN PATENT DOCUMENTS

| CN | 104932966 A | 9/2015 |
| CN | 105824834 A | 8/2016 |

(Continued)

OTHER PUBLICATIONS

European Search Report and Written Opinion for related European application No. 17923944.7, dated Apr. 23, 2020 (7 pages).

(Continued)

*Primary Examiner* — Noosha Arjomandi
(74) *Attorney, Agent, or Firm* — Young Basile Hanlon & MacFarlane, P.C.

(57) ABSTRACT

A method for search resource recommendation is disclosed. The method includes receiving a search request sent from a terminal, which includes a search keyword; searching a set of resources corresponding to the search keyword and analyzing each resource in the set of resources to determine which resource is a boost-traffic resource and which resource is an un-boost-traffic resource, wherein the boost-traffic resource is a resource having a traffic amount maliciously boosted in a set duration, and the un-boost-traffic resource is a resource having a normal traffic amount; and obtaining a total traffic amount of the un-boost-traffic resource and an adjusted traffic amount of the boost-traffic resource, determining a recommendation strategy of the set of resources according to the total traffic amount of the un-boost-traffic resource and the adjusted traffic amount of the boost-traffic resource, and sending the set of resources to the terminal according to the recommendation strategy.

18 Claims, 6 Drawing Sheets

(58) Field of Classification Search
CPC ............ G06F 11/3409; G06F 11/3006; G06F 16/2471; G06Q 20/308
See application file for complete search history.

(56) References Cited

U.S. PATENT DOCUMENTS

| | | | | |
|---|---|---|---|---|
| 9,372,735 | B2* | 6/2016 | Calder | G06F 9/5077 |
| 9,699,209 | B2* | 7/2017 | Ng | G06Q 10/0635 |
| 11,113,294 | B1* | 9/2021 | Bourbie | G06F 16/24568 |
| 11,120,483 | B1* | 9/2021 | Cigich | G06Q 30/0269 |
| 11,157,497 | B1* | 10/2021 | Batsakis | G06F 16/24539 |
| 11,178,687 | B2* | 11/2021 | Lee | H04L 5/16 |
| 11,188,397 | B2* | 11/2021 | Cristofi | G06F 21/62 |
| 2004/0064351 | A1 | 4/2004 | Mikurak | |
| 2012/0047120 | A1* | 2/2012 | Connolly | G06F 16/958 707/706 |
| 2014/0136901 | A1 | 5/2014 | Butler et al. | |
| 2015/0039432 | A1* | 2/2015 | Rao | G06Q 30/0256 705/14.54 |
| 2015/0205639 | A1 | 7/2015 | Matsumoto et al. | |
| 2016/0043993 | A1* | 2/2016 | Gupta | H04L 61/3025 709/245 |
| 2016/0171589 | A1* | 6/2016 | Glover | G06Q 30/0631 705/26.7 |
| 2016/0224999 | A1* | 8/2016 | Mukherjee | G06F 16/9535 |
| 2016/0300260 | A1* | 10/2016 | Cigich | G06Q 30/0277 |
| 2016/0308936 | A1* | 10/2016 | Yuan | H04L 67/02 |
| 2016/0315942 | A1 | 10/2016 | Liu | |
| 2018/0130119 | A1* | 5/2018 | Korac | G06F 16/9566 |
| 2019/0339823 | A1* | 11/2019 | Shaffer | H04L 51/32 |
| 2020/0007461 | A1* | 1/2020 | Zhang | H04L 47/762 |
| 2020/0026772 | A1* | 1/2020 | Wheeler | G06F 16/9535 |
| 2020/0104898 | A1* | 4/2020 | Cui | G06Q 30/0631 |
| 2021/0250368 | A1* | 8/2021 | Hearty | H04L 63/20 |

FOREIGN PATENT DOCUMENTS

| | | |
|---|---|---|
| CN | 106844655 A | 6/2017 |
| CN | 107071802 A | 8/2017 |

OTHER PUBLICATIONS

International search report,PCT/CN2017/100082, dated Mar. 31, 2018 (2 pages).
Indian Examination Report for IN Application 202017013136 dated Nov. 2, 2021. (5 pages).

* cited by examiner

METHOD FOR SEARCH RESOURCE RECOMMENDATION AND SMART DEVICE

CROSS-REFERENCE TO RELATED APPLICATION(S)

This application is a continuation application of International (PCT) Patent Application No. PCT/CN2017/100082, filed on Aug. 31, 2017, the content of which is herein incorporated by reference in its entirety.

TECHNICAL FIELD

The present disclosure generally relates to the technical field of communication, and in particular, to a method for search resource recommendation, a smart device, and a non-transitory storage medium.

BACKGROUND

The traffic amount is one important reference for the operation center to judge the popularity of each application. The traffic amount means the number of times that one application is downloaded by users. Generally speaking, for one application, the larger the traffic amount is, the more popular the application. Therefore, the traffic amount is a very important reference for an application. In order to increase the traffic amount of the application, the phenomenon of maliciously-boosting traffic amount occurs. The maliciously-boosting traffic amount means that a situation where the traffic amount exceeds a set value in a duration. How to eliminate the maliciously-boosting traffic amount has become a problem to be solved by each search module. The current search module cannot remove the maliciously-boosting traffic amount, making it impossible for users to search for popular resources through the search module and then affecting users' experiences.

SUMMARY

According to one aspect of the present disclosure, a method for search resource recommendation is provided, including: receiving a search request sent from a terminal, wherein the search request includes a search keyword; searching a set of resources corresponding to the search keyword and analyzing each resource in the set of resources to determine which resource in the set of resources is a boost-traffic resource and determine which resource is an un-boost-traffic resource, wherein the boost-traffic resource is a resource having a traffic amount maliciously boosted in a set duration, and the un-boost-traffic resource is a resource having a normal traffic amount; and obtaining a total traffic amount of the un-boost-traffic resource and an adjusted traffic amount of the boost-traffic resource, determining a recommendation strategy of the set of resources according to the total traffic amount of the un-boost-traffic resource and the adjusted traffic amount of the boost-traffic resource, and sending the set of resources to the terminal according to the recommendation strategy.

According to another aspect of the present disclosure, a smart device is provided, including a non-transitory memory storing one or more programs, a transceiver, and a processor, wherein when the one or more programs causing the processor to perform searching a set of resources corresponding to a search keyword and analyzing each resource in the set of resources to determine which resource in the set of resources is a boost-traffic resource and determine which resource is an un-boost-traffic resource, wherein the boost-traffic resource is a resource having a traffic amount maliciously boosted in a set duration, and the un-boost-traffic resource is a resource having a normal traffic amount; and obtaining a total traffic amount of the un-boost-traffic resource and an adjusted traffic amount of the boost-traffic resource, determining a recommendation strategy of the set of resources according to the total traffic amount of the un-boost-traffic resource and the adjusted traffic amount of the boost-traffic resource to recommend the set of resources according to the recommendation strategy.

According to yet another aspect of the present disclosure, a non-transitory storage medium is provided, storing a plurality of instructions, when executed, when executed causing a processor to perform: searching a set of resources corresponding to a search keyword and analyzing each resource in the set of resources to determine which resource in the set of resources is a boost-traffic resource and determine which resource is an un-boost-traffic resource, wherein the boost-traffic resource is a resource having a traffic amount maliciously boosted in a set duration, and the un-boost-traffic resource is a resource having a normal traffic amount; and obtaining a total traffic amount of the un-boost-traffic resource and an adjusted traffic amount of the boost-traffic resource, determining a recommendation strategy of the set of resources according to the total traffic amount of the un-boost-traffic resource and the adjusted traffic amount of the boost-traffic resource to recommend the set of resources according to the recommendation strategy.

BRIEF DESCRIPTION OF DRAWINGS

In order to clearly explain the technical solutions in embodiments of the present disclosure or in the art, the drawings used in the description of the embodiments or the art will be briefly described below. Obviously, the drawings in the following description are merely for some embodiments of the present disclosure. For those of ordinary skill in the art, other drawings may also be obtained based on these drawings without any creative works.

DETAILED DESCRIPTION

Figure 1:
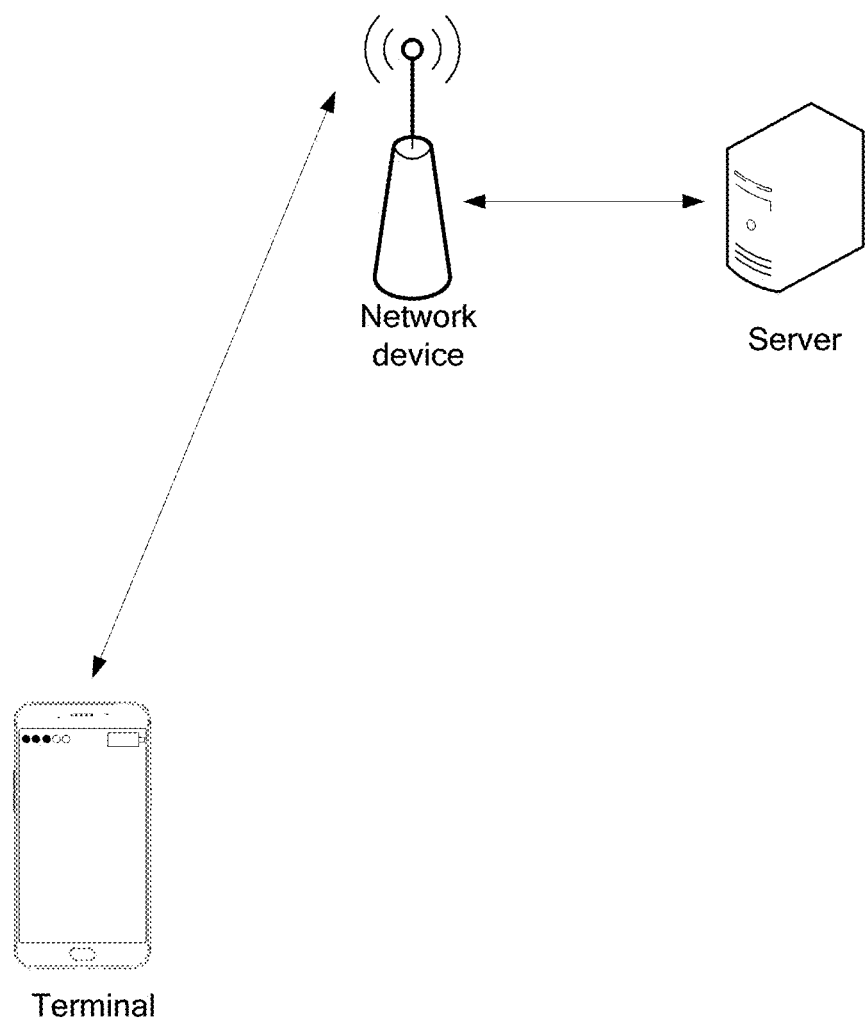
FIG. 1 is a diagram of a network architecture

The technical solutions in the embodiments of the present application are clearly and completely described in the following with reference to the accompanying drawings in the embodiments of the present application. It is obvious that the described embodiments are only a part of the embodiments of the present application, but not all embodiments.

All other embodiments obtained by a person skilled in the art based on the embodiments of the present application without creative efforts are within the scope of the present application.

It should be understood that when used in this specification and the appended claims, the term "comprising" indicates the presence of described features, entirety, steps, operations, elements and/or components, but does not exclude one or more the presence or addition of other features, entireties, steps, operations, elements, components, and/or a combination thereof.

It should also be understood that terminology used in the description of the present disclosure herein is for the purpose of describing particular embodiments only and is not intended to limit the present disclosure. As used in this specification and the appended claims, the singular forms "a", "an" and "the" are intended to include the plural forms unless the context clearly indicates other cases.

It should also be further understood that the term "and/or" used in the description of the present disclosure and the appended claims refers to any combination of one or more of the listed items and all possible combinations, and includes these combinations.

As used in this specification and the appended claims, the terms "if" may be construed as "when", "upon", "in response to determining", or "in response to detecting" in accordance with the context. Similarly, depending on the context, the phrase "if determined" or "if [the described condition or event] is detected" can be interpreted to mean "once determined", "in response to determining", "once [the condition or event described]" is detected, or "in response to detecting [the described condition or event]".

A method for search resource recommendation is provided, including: receiving a search request sent from a terminal, wherein the search request includes a search keyword; searching a set of resources corresponding to the search keyword and analyzing each resource in the set of resources to determine which resource in the set of resources is a boost-traffic resource and determine which resource is an un-boost-traffic resource, wherein the boost-traffic resource is a resource having a traffic amount maliciously boosted in a set duration, and the un-boost-traffic resource is a resource having a normal traffic amount; and obtaining a total traffic amount of the un-boost-traffic resource and an adjusted traffic amount of the boost-traffic resource, determining a recommendation strategy of the set of resources according to the total traffic amount of the un-boost-traffic resource and the adjusted traffic amount of the boost-traffic resource, and sending the set of resources to the terminal according to the recommendation strategy.

In some embodiments, the analyzing each resource in the set of resources to determine which resource in the set of resources is a boost-traffic resource and determine which resource is an un-boost-traffic resource includes: obtaining a first resource from the set of resources, and determining whether the first resource is the boost-traffic resource.

In some embodiments, the determining whether the first resource is the boost-traffic resource includes: obtaining the first number of download requests of the first resource in the set duration, wherein the download requests of the first resource is distributed in a map; obtaining coordinates of the download requests in the map in response to the first number being greater than a first threshold, wherein each of the coordinates is marked with a marker in the map, and the map is divided into a plurality of rectangles having a same area; obtaining the second number of coordinates in each rectangle such that a set of second numbers is obtained; and obtaining the third number of second numbers in the set of second numbers greater than a second threshold and the maximum number in the set of second numbers. The first resource is determined as the boost-traffic resource in response to the third number being greater than a third threshold or the maximum number being greater than a fourth threshold; and the first resource is determined as the boost-traffic resource in response to the third number not being greater than the third threshold or the maximum number not being greater than the fourth threshold.

In some embodiments, the determining whether the first resource is the boost-traffic resource includes: obtaining the first number of download requests of the first resource in the set duration; obtaining terminal identifiers for the download requests in response to the first number being greater than a first threshold; obtaining a traffic amount of the first resource for each terminal identifier such that a set of second numbers is obtained; obtaining the third number of second numbers in the set of second numbers greater than a fifth threshold. The first resource is determined as the boost-traffic resource in response to the third number being greater than a sixth threshold; and the first resource is determined as the un-boost-traffic resource in response to the third number being not greater than the sixth threshold.

In some embodiments, the determining whether the first resource is the boost-traffic resource includes: obtaining the first number of download requests of the first resource in the set duration, wherein the download requests of the first resource is distributed in a map; obtaining coordinates of the download requests in the map in response to the first number being greater than a first threshold, wherein each of the coordinates is marked with a marker in the map, and the map is shot to obtain a first image; determining a basic abnormal range for any two markers in the first image, wherein one marker of the two markers has at least n pixel locations same with that of the other marker, and the basic abnormal range is a circle having a center being a center point of a line segment between the two markers and a diameter being a length of the line segment, wherein the length of the line segment is less than a length threshold; combining basic abnormal ranges overlapped with each other to obtain a combined abnormal range; and obtaining a total area of the combined abnormal range. The first resource is determined as the boost-traffic resource in response to the total area being greater than an area threshold.

In some embodiments, the recommendation strategy includes one or any combinations of a strategy of arranging according to a traffic amount, a strategy of arranging according to both a traffic amount and a click amount and a strategy of shielding.

In some embodiments, the determining a recommendation strategy of the set of resources according to the total traffic amount of the un-boost-traffic resource and the adjusted traffic amount of the boost-traffic resource further includes: analyzing the boost-traffic resource to determine whether the boost-traffic resource is an accurate search for the search keyword; and determining the recommendation strategy of the boost-traffic resource as ignoring the boost-traffic resource in response to the boost-traffic resource not being the accurate search for the search keyword.

In some embodiments, the determining the recommendation strategy of the boost-traffic resource as ignoring the boost-traffic resource includes shielding the boost-traffic resource.

In some embodiments, $x=k*(y-z)$, wherein x is the adjusted traffic amount of the boost-traffic resource, y is a total traffic amount of the boost-traffic resource, z is a maliciously-boosted traffic amount of the boost-traffic resource, k is a set coefficient, and a value of k is greater than 0 and less than or equal to 1.

A smart device is also provided, including a non-transitory memory storing one or more programs, a transceiver, and a processor, wherein when the one or more programs causing the processor to perform searching a set of resources corresponding to a search keyword and analyzing each resource in the set of resources to determine which resource in the set of resources is a boost-traffic resource and determine which resource is an un-boost-traffic resource, wherein the boost-traffic resource is a resource having a traffic amount maliciously boosted in a set duration, and the un-boost-traffic resource is a resource having a normal traffic amount; and obtaining a total traffic amount of the un-boost-traffic resource and an adjusted traffic amount of the boost-traffic resource, determining a recommendation strategy of the set of resources according to the total traffic amount of the un-boost-traffic resource and the adjusted traffic amount of the boost-traffic resource to recommend the set of resources according to the recommendation strategy.

In some embodiments, the analyzing each resource in the set of resources to determine which resource in the set of resources is a boost-traffic resource and determine which resource is an un-boost-traffic resource includes: obtaining a first resource from the set of resources and the first number of download requests of the first resource in the set duration, wherein the download requests of the first resource is distributed in a map; obtaining coordinates of the download requests in the map in response to the first number being greater than a first threshold, wherein each of the coordinates is marked with a marker in the map, and the map is divided into a plurality of rectangles having a same area; obtaining the second number of coordinates in each rectangle such that a set of second numbers is obtained; obtaining the third number of second numbers in the set of second numbers greater than a second threshold and the maximum number in the set of second numbers; determining the first resource as the boost-traffic resource in response to the third number being greater than a third threshold or the maximum number being greater than a fourth threshold; and determining the first resource as the boost-traffic resource in response to the third number not being greater than the third threshold or the maximum number not being greater than the fourth threshold.

In some embodiments, the analyzing each resource in the set of resources to determine which resource in the set of resources is a boost-traffic resource and determine which resource is an un-boost-traffic resource includes: obtaining a first resource from the set of resources and the first number of download requests of the first resource in the set duration; obtaining terminal identifiers for the download requests in response to the first number being greater than a first threshold; obtaining a traffic amount of the first resource for each terminal identifier such that a set of second numbers is obtained; obtaining the third number of second numbers in the set of second numbers greater than a fifth threshold; determining the first resource as the boost-traffic resource in response to the third number being greater than a sixth threshold; and determining the first resource as the un-boost-traffic resource in response to the third number being not greater than the sixth threshold.

In some embodiments, the analyzing each resource in the set of resources to determine which resource in the set of resources is a boost-traffic resource and determine which resource is an un-boost-traffic resource includes: obtaining a first resource from the set of resources and the first number of download requests of the first resource in the set duration, wherein the download requests of the first resource is distributed in a map; obtaining coordinates of the download requests in the map in response to the first number being greater than a first threshold, wherein each of the coordinates is marked with a marker in the map, and the map is shot to obtain a first image; determining a basic abnormal range for any two markers in the first image, wherein one marker of the two markers has at least n pixel locations same with that of the other marker, and the basic abnormal range is a circle having a center being a center point of a line segment between the two markers and a diameter being a length of the line segment, wherein the length of the line segment is less than a length threshold; combining basic abnormal ranges overlapped with each other to obtain a combined abnormal range; obtaining a total area of the combined abnormal range; and determining the first resource as the boost-traffic resource in response to the total area being greater than an area threshold.

In some embodiments, the recommendation strategy includes one or any combinations of a strategy of arranging according to a traffic amount, a strategy of arranging according to both a traffic amount and a click amount and a strategy of shielding.

In some embodiments, the determining a recommendation strategy of the set of resources according to the total traffic amount of the un-boost-traffic resource and the adjusted traffic amount of the boost-traffic resource further includes: determining whether the boost-traffic resource is an accurate search for the search keyword; and determining the recommendation strategy of the boost-traffic resource as shielding the boost-traffic resource in response to the boost-traffic resource not being the accurate search for the search keyword.

In some embodiments, $x=k*(y-z)$, wherein x is the adjusted traffic amount of the boost-traffic resource, y is a total traffic amount of the boost-traffic resource, z is a maliciously-boosted traffic amount of the boost-traffic resource, k is a set coefficient, and a value of k is greater than 0 and less than or equal to 1.

A non-transitory storage medium is also provided, storing a plurality of instructions, when executed, when executed causing a processor to perform: searching a set of resources corresponding to a search keyword and analyzing each resource in the set of resources to determine which resource in the set of resources is a boost-traffic resource and determine which resource is an un-boost-traffic resource, wherein the boost-traffic resource is a resource having a traffic amount maliciously boosted in a set duration, and the un-boost-traffic resource is a resource having a normal traffic amount; and obtaining a total traffic amount of the un-boost-traffic resource and an adjusted traffic amount of the boost-traffic resource, determining a recommendation strategy of the set of resources according to the total traffic amount of the un-boost-traffic resource and the adjusted traffic amount of the boost-traffic resource to recommend the set of resources according to the recommendation strategy.

In some embodiments, the analyzing each resource in the set of resources to determine which resource in the set of resources is a boost-traffic resource and determine which resource is an un-boost-traffic resource includes: obtaining a first resource from the set of resources and the first number of download requests of the first resource in the set duration, wherein the download requests of the first resource is distributed in a map; obtaining coordinates of the download requests in the map in response to the first number being greater than a first threshold, wherein each of the coordinates is marked with a marker in the map, and the map is divided into a plurality of rectangles having a same area; obtaining the second number of coordinates in each rectangle such that a set of second numbers is obtained; obtaining the third number of second numbers in the set of second numbers greater than a second threshold and the maximum number in the set of second numbers; determining the first resource as the boost-traffic resource in response to the third number being greater than a third threshold or the maximum number being greater than a fourth threshold; and determining the first resource as the boost-traffic resource in response to the third number not being greater than the third threshold or the maximum number not being greater than the fourth threshold.

In some embodiments, the analyzing each resource in the set of resources to determine which resource in the set of resources is a boost-traffic resource and determine which resource is an un-boost-traffic resource includes: obtaining a first resource from the set of resources and the first number of download requests of the first resource in the set duration; obtaining terminal identifiers for the download requests in response to the first number being greater than a first threshold; obtaining a traffic amount of the first resource for each terminal identifier such that a set of second numbers is obtained; obtaining the third number of second numbers in the set of second numbers greater than a fifth threshold; determining the first resource as the boost-traffic resource in response to the third number being greater than a sixth threshold; and determining the first resource as the un-boost-traffic resource in response to the third number being not greater than the sixth threshold.

In some embodiments, the analyzing each resource in the set of resources to determine which resource in the set of resources is a boost-traffic resource and determine which resource is an un-boost-traffic resource includes: obtaining a first resource from the set of resources and the first number of download requests of the first resource in the set duration, wherein the download requests of the first resource is distributed in a map; obtaining coordinates of the download requests in the map in response to the first number being greater than a first threshold, wherein each of the coordinates is marked with a marker in the map, and the map is shot to obtain a first image; determining a basic abnormal range for any two markers in the first image, wherein one marker of the two markers has at least n pixel locations same with that of the other marker, and the basic abnormal range is a circle having a center being a center point of a line segment between the two markers and a diameter being a length of the line segment, wherein the length of the line segment is less than a length threshold; combining basic abnormal ranges overlapped with each other to obtain a combined abnormal range; obtaining a total area of the combined abnormal range; and determining the first resource as the boost-traffic resource in response to the total area being greater than an area threshold.

FIG. 1 is a diagram of a network architecture. As shown in FIG. 1, the mobile terminal may include a smart phone (such as an Android phone, an iOS phone, a Windows Phone, etc.), a tablet computer, a handheld computer, a notebook computer, a Mobile Internet Device (MID), or a wearable device. The mobile terminal as described above are only for an example, and not exhaustive, including but not limited to the above mobile terminals. For convenience of description, the above mobile terminals are called as a user equipment (UE) in the following embodiments. Of course, in an actual application, the above-mentioned user equipment is not limited to modification forms of the above-mentioned user equipment, and may include, for example, a smart vehicle terminal, a computer device, and the like. The terminal may be communicated with a network-side device by a wireless link, or connected with a network-side device in a wired manner. The network-side device may be connected with a server in a wireless or wired manner. The connection manner may be a single connection manner, a dual connection manner, or a multiple connection manner. When the connection manner is a single connection manner, the network-side device may be a base station, such as an LTE base station or an NR base station (also known as gNB). When the connection manner is a dual connection manner (in which carrier aggregation (CA) is specifically used, or multiple network-side devices are used), and the terminal is connected with multiple network-side devices, the multiple network-side devices may be a master base station and a secondary base station, and data is backhauled through a backhaul link among the base stations. The master base station may be a NR base station, and the secondary base station may also be a NR base station.

Figure 2:
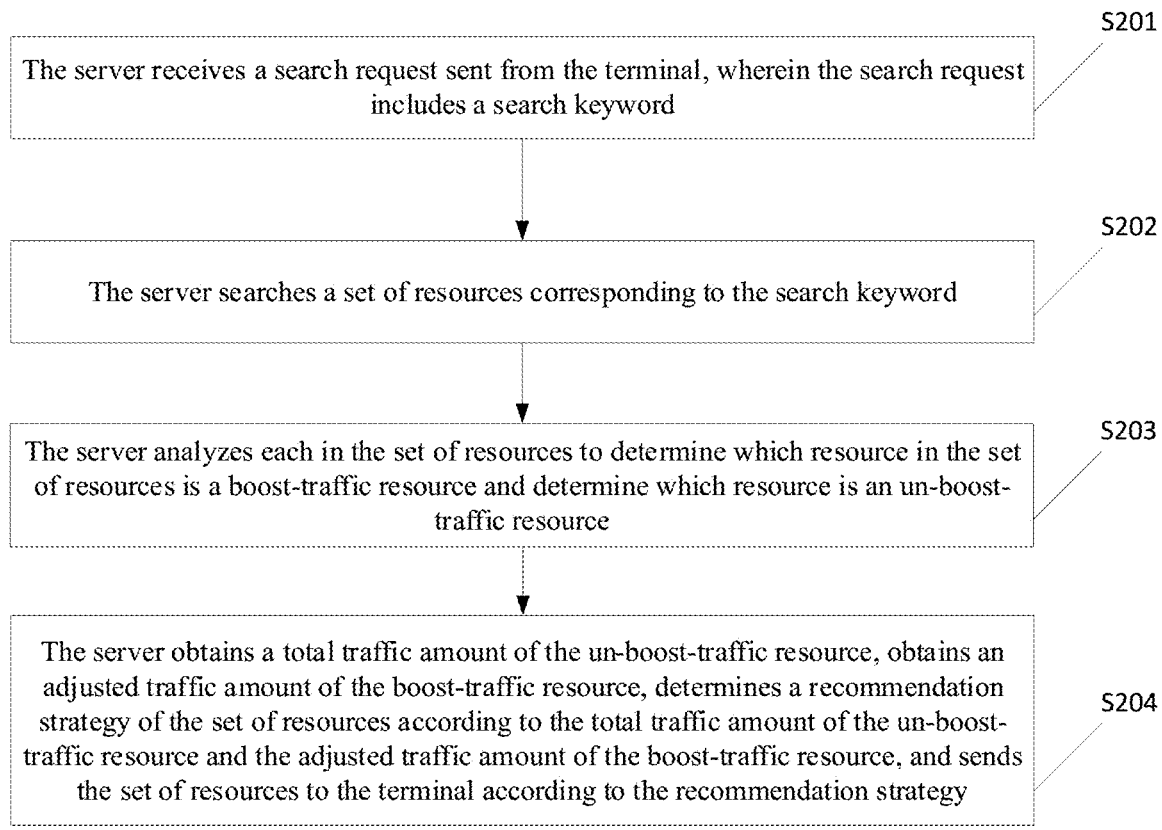
FIG. 2 is a flow chart of a method for search resource recommendation according to embodiments of the present disclosure.

FIG. 2 illustrates a method for search resource recommendation according to embodiments of the present disclosure. The method is executed by a server. Specifically, the server may be a physical server, such as a computer, a smart device, a workstation, or the like. Of course, the server may also be a cloud device, and the specific implementation of the server is not limited in specific implementations of the present disclosure. As shown in FIG. 2, the method includes actions/operations in the following blocks.

At block S201, the server receives a search request sent from the terminal. The search request includes a search keyword.

The server receives a search request sent from the terminal in a wired or wireless manner. Specifically, for example, the terminal sends a search request in HTTP (Hypertext Transfer Protocol) to the server in a wired manner. Of course, in a practical application, the search request can also be sent in other manners. For example, the terminal sends a search request to the server wirelessly. The search request can be sent on PUCCH (Physical Uplink Control Channel) or PUSCH (Physical Uplink Shared Channel). The search request may include a terminal identifier.

Specifically, the terminal identifier may include the number of the terminal, the MAC (Media Access Control) address of the terminal, the IMIE (International Mobile Equipment Identity number) of the terminal, and IP address of the terminal. Of course, other terminal identifiers can also be used in actual applications. The specific implementation of the terminal identifier described above is not limited in specific implementations of the present disclosure.

At block S202, the server searches a set of resources corresponding to the search keyword.

There may be multiple resources in the set of resources in the above block S202. Specifically, a resource may be a URL link. Of course, in practical applications, the resource may also be a picture or a quick entry for the resource, etc. The specific form of the resource is not limited in specific implementations of the present disclosure.

For a search algorithm used to search the resources corresponding to the search keyword based on the search keyword, it is not limited in specific embodiments of the present disclosure. An internal search algorithm can be used to search resources. A network search algorithm can also be used to search resources. The specific form of the search algorithm is not limited in specific implementations of the present disclosure.

At block S203, the server analyzes each in the set of resources to determine which resource in the set of resources is a boost-traffic resource and determine which resource is an un-boost-traffic resource.

Specifically, in a way to determine a boost-traffic resource and an un-boost-traffic resource in the foregoing block S203, a first resource is determined as a boost-traffic resource if the first resource has a traffic amount maliciously-boosted in a set duration, and otherwise, the first resource is determined as an un-boost-traffic resource if the first resource has a traffic amount maliciously un-boosted in the set period. That is, the boost-traffic resource is a resource having a traffic amount maliciously-boosted in the set duration, and the un-boost-traffic resource is a resource having a normal traffic amount. The way to determine whether the first resource has a maliciously-boosted traffic amount may be referred to description of the following embodiments, and details are not described herein again.

At block S204, the server obtains a total traffic amount of the un-boost-traffic resource, obtains an adjusted traffic amount of the boost-traffic resource, determines a recommendation strategy of the set of resources according to the total traffic amount of the un-boost-traffic resource and the adjusted traffic amount of the boost-traffic resource, and sends the set of resources to the terminal according to the recommendation strategy.

Specifically, the adjusted traffic amount of the boost-traffic resource in the foregoing block S204 may be that, the adjusted traffic amount=k*(a total traffic amount−a maliciously-boosted traffic amount) of the boost-traffic resource. Wherein k is a set coefficient, and the value of k is greater than zero and less than or equal to 1.

The recommendation strategy in the above block S204 may be set by the manufacturer or the operator on its own. For example, the recommendation strategy is a strategy of arranging according to a traffic amount. For another example, the recommendation strategy is a strategy of arranging according to both a traffic amount and a click amount. The specific form of the above recommendation strategy is not limited in specific implementations of the present disclosure, and only the parameter, i.e. the traffic amount, may be obtained or referred for the recommendation strategy.

In the technical solution according to the present disclosure, after the search request is received, resources are obtained as searching according to the search keyword corresponding to the search request. The resources are then divided into the boost-traffic resource and the un-boost-traffic resource. A strategy for obtaining the traffic amount is determined according to that whether the traffic amount is boosted, and then the recommendation strategy is determined according to the traffic amount. Thus, the recommendation of the un-boost-traffic resource is optimized, which reflects the public's hot spots and improves users' experience.

Alternatively, regarding to determining the recommendation strategy of the set of resources according to the total traffic amount of the un-boost-traffic resource and the adjusted traffic amount of the boost-traffic resource, the method further includes the following actions/operations.

The method analyzes the boost-traffic resource to determine whether the boost-traffic resource is an accurate search for the search keyword, and ignores the boost-traffic resource if the boost-traffic resource is an inaccurate search of the search keyword.

The principle of the above solution is that, when the boost-traffic resource is an inaccurate search, i.e. during a fuzzy search, the boost-traffic resource is directly ignored. That is, the boost-traffic resource can be shielded, which can avoid recommendations for the boost-traffic resource during the fuzzy search. The technical scenario of this application is mainly as follows. For the search module, the ideal state is that users can search for the resources they need during the fuzzy search. Taking the search keyword "Delivery" as an example, what the user needs may be a first website (which is a delivery website), but in the search order, rank of a second website is improved by maliciously-boosting or some other ways, such that the second website is ranked before the first website. This is very unfair for the first website. And the search module also cannot accurately reflect the current hotspots. If this situation is not removed, only the boost-traffic resource will be eliminated, which will not achieve the purpose of warning. For detecting the boost-traffic resource, due to large calculations and tedious work, this must be automatically evaluated by the terminal on its own. Any software that prevents the boost-traffic resource cannot guarantee to detect all the boost-traffic resources, and probably just detect some typical boost-traffic resources with other boost-traffic resources being not detected. The traffic amount of the second website will also be high in the long term. In this case, the traffic amount of the second website can be boosted without any doubt, because there is no other additional consequence (namely consequences other than maliciously-boosting traffic) for the second website. Regarding to this, the present disclosure needs to technically prevent similar cases occurring with affecting users' use. Therefore, it is determined whether the boost-traffic resource is an accurate search herein. If the boost-traffic resource is the accurate search, it will not be shielded even though it is the boost-traffic resource. If the boost-traffic resource is a fuzzy search, it will be ignored. The reason why the accurate search is not shielded herein is that, the accurate search must have corresponding results for the users, otherwise, the users may not use the search module. Therefore, un-shielding the accurate search herein is to improve user experience.

Taking a practical example to describe in the following. Given that the boost-traffic resource is XXX and its corresponding category is a mobile phone. If the search keyword is "mobile phone", the XXX will not appear in the search result since the XXX is a fuzzy search. If the search keyword is "XXX", the XXX will appear in the search result since the XXX is an accurate search.

Alternatively, a manner of the above-mentioned determining whether the first resource is the boost traffic resource is specifically the following.

The first number of multiple download requests of the first resource in a set period is obtained. Coordinates for the multiple download requests in a map is obtained if the first number is greater than a first threshold. Each download request is marked with a marker at a corresponding coordinate in a map. The map is divided into a plurality of rectangles having a same area. The set of coordinates (i.e. the number of coordinates) in each rectangle is obtained such that a set of second numbers is obtained. The number of numbers in the set of second numbers is greater than a second threshold and the maximum number in the set of second numbers are then obtained. The first resource is determined as a boost-traffic resource, if the number of numbers which are greater than the second threshold, is greater than a third threshold or the maximum number is greater than a fourth threshold. Otherwise, the first resource is determined as an un-boost-traffic resource.

Figure 3A:
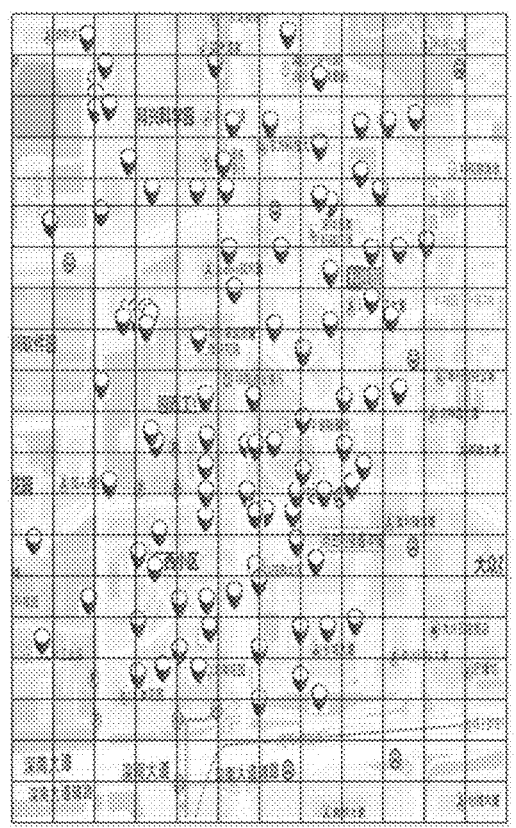
FIG. 3a is a schematic diagram of a map with markers according to embodiments of the present disclosure.

FIG. 3a is a schematic diagram of a map with markers. As shown in FIG. 3a, the map is divided into a plurality of rectangles (which may also be squares in a special case). The number of coordinates in each rectangle with a same area is obtained. For maliciously-boosted traffic amount, there generally are two situations through our research. In a first situation, the coordinates are relatively-fixed. In this situation, many terminals download a large amount of data at a very limited location (such as an office). In a second situation, the coordinates are not relatively-fixed but in a range where the traffic amounts at the coordinates is greater than a normal amount. In this situation, a device, which is to maliciously-boost the traffic amount, generally finishes a corresponding boost-traffic during a move. Therefore, in order to propose the above two situations, if the traffic amount in a set area is determined to be massive, it is determined as the maliciously-boosted traffic amount. This solution corresponds to the first situation. Further, if the number of set areas having a traffic amount greater than a set amount is greater than a set value, it is determined as the maliciously-increasing amount. This solution corresponds to the second situation.

Alternatively, a manner of the above-mentioned determining whether the first resource is the boost-traffic resource is also specifically the following.

Figure 3B:
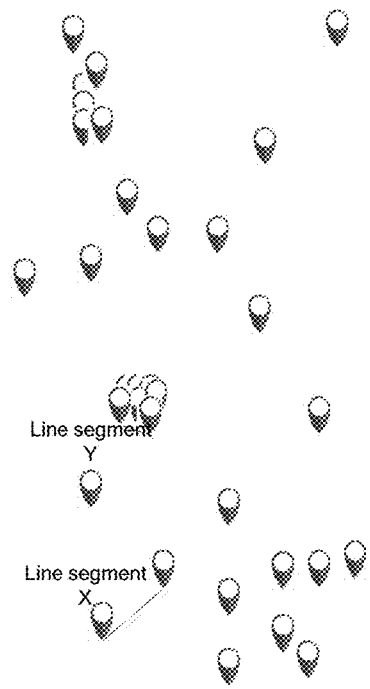
FIG. 3b is a schematic diagram of a screenshot processing according to embodiments of the present disclosure.

The first number of multiple download requests of the first resource in a set period is obtained. Coordinates for the multiple download requests in a map is obtained if the first number is greater than a first threshold. Each download request is marked with a marker at a corresponding coordinate in a map. A screenshot processing is performed for the map to obtain a schematic diagram of a first image shown in FIG. 2b. An identification processing is performed for the first image in the FIG. 3b to obtain pixel locations of the markers in the first image. A set of pixel locations of marker A and a set of pixel locations of marker B are obtained. If the set of pixel locations of marker A has at least n pixel locations same with that in the set of pixel locations of marker B, the marker A is determined to be overlapped with the marker B. The coordinate A of the marker A is connected with the coordinate B to form a line segment (i.e. the line segment Y shown in FIG. 3b). If the length of the line segment is less than a length threshold, a range of a circle having the center point of the line segment as the center and the length of the line segment as diameter is determined as a basic abnormal range (if the length of the line segment is greater than the length threshold, the line segment is removed). The markers in the first image are processed to obtain a plurality of basic abnormal ranges. The basic abnormal ranges with overlapping areas are combined to obtain a combined abnormal range. That is, the basic abnormal ranges overlapped with each other are combined. The total area of the combined abnormal range is obtained. If the total area is greater than an area threshold, the first resource is determined as the boost-traffic resource.

Alternatively, a manner of the above-mentioned determining whether the first resource is the boost-traffic resource is specifically the following.

The first number of multiple download requests of the first resource in a set period is obtained. If the first number is greater than a first threshold, terminal identifiers for multiple download requests are obtained. A traffic amount of the first resource for each terminal identifier is obtained such that a set of third numbers is obtained, and the second number of third numbers greater than a fifth threshold in the set of third numbers is obtained. That is, one third number in the set of third numbers indicates a traffic amount of the first resource for a terminal identifier. If the second number of third numbers is greater than a sixth threshold, the first resource is determined as the boost-traffic resource.

In this technical solution, whether the first resource is a boost-traffic resource or not is considered from the perspective of traffic amount for the same terminals being too large. Because the number of terminals used for boosting-traffic is limited, and then multiple same terminals are repeatedly used to download the same resource in a certain duration. Thus, a traffic amount for each terminal identifier are obtained to form a set of third numbers, and the number of numbers greater than a certain threshold in the set of third number is obtained. If the number of numbers exceeds a set value, it can be learned that the resource has a very large traffic amount on the same terminals in a set duration, and then the resource can basically be determined as a boost-traffic resource.

Figure 4:
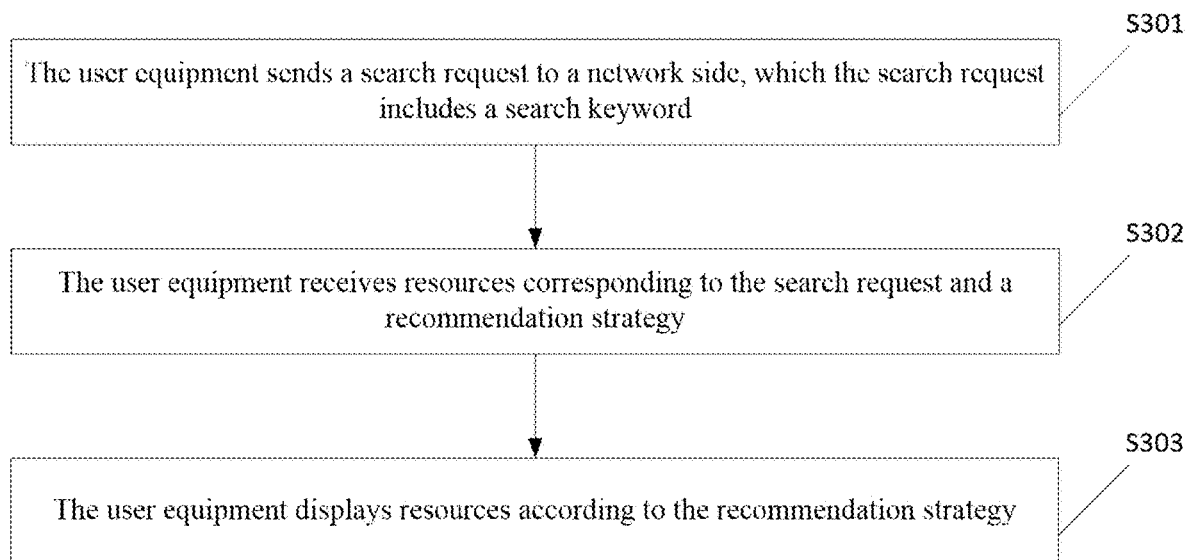
FIG. 4 is a flow chart of a method for obtaining search resources according to embodiments of the present disclosure.

FIG. 4 illustrates a method for obtaining a search resource. The method is implemented by a user equipment. The user equipment may be a smart phone (such as an Android phone, an iOS phone, a Windows phone, etc.), a tablet computer, a handheld computer, a notebook computer, a Mobile Internet Device (MID), or a wearable device. As shown in FIG. 4, the method includes actions/operations in the following blocks.

At block S301, the user equipment sends a search request to a network side. The search request includes a search keyword.

The search request in the above block S301 may be sent in a wireless or wired manner. For example, a search request based on HTTP can be sent. Of course, the search request can also be sent in other manners such as a wireless manner. For example, the search request can be sent on PUCCH or PUSCH. The search request may also carry an identifier of the user equipment.

The above identifier of the user equipment may specifically be one or any combination of the number of the user equipment, the MAC address of the user equipment, the IMIE of the user equipment, and IP address of the user equipment. Of course, other identifiers can also be used in actual applications. The specific implementation of the identifier described above is not limited in specific implementations of the present disclosure.

At block S302, the user equipment receives a set of resources corresponding to the search request and a recommendation strategy.

The resources in the block S302 may include a boost-traffic resource and an un-boost-traffic resource. The recommendation strategy may be a recommendation strategy for the set of resources. Of course, a recommendation strategy can also be set for the boost-traffic resource and the un-boost-traffic resource.

At block S303, the user equipment displays the set of resources according to the recommendation strategy.

The user equipment according to embodiments of the present disclosure implements acquiring resources corresponding to the search request, and displaying the resources according to the recommendation strategy sent from the network side, and supports the implementation of embodiments shown in FIG. 2. Therefore, this has advantages of improving user experience.

Figure 5:
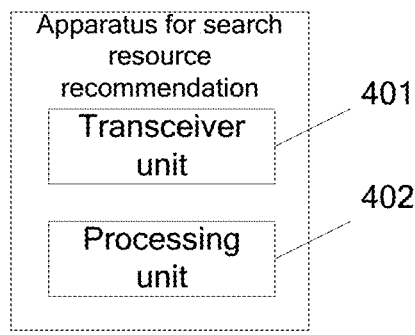
FIG. 5 is a flow chart of an apparatus for search resource recommendation according to embodiments of the present disclosure.

FIG. 5 illustrates an apparatus for search resource recommendation. Technical terms and refinement schemes of the foregoing apparatus be referred to the description of the embodiment shown in FIG. 2, and details are not described herein again. The apparatus includes the following.

A transceiver unit 401, which is configured for receiving a search request sent from the terminal. The search request includes a search keyword.

A processing unit 402, which is configured for searching a set of resources corresponding to the search keyword, analyzing each in the set of resources to determine which in the set of resources is a boost-traffic resource and an un-boost-traffic resource; obtaining a total traffic amount of the un-boost-traffic resource, obtaining an adjusted traffic amount of the boost-traffic resource, determining a recommendation strategy of the set of resources according to the total traffic amount of the un-boost-traffic resource and the adjusted traffic amount of the boost-traffic resource, and sending the set of resources to the terminal according to the recommendation strategy.

Alternatively, the processing unit 402 is specifically configured for obtaining first resource from the set of resources, determining a first resource as a boost-traffic resource if the first resource has a traffic amount maliciously-boosted in a set duration, and otherwise, determining the first resource as an un-boost-traffic resource if the first resource has a traffic amount maliciously un-boosted in the set period.

Alternatively, the processing unit 402 is specifically configured for the following actions/operations. The first number of multiple download requests of the first resource in a set period is obtained. Coordinates for the multiple download requests in a map is obtained if the first number is greater than a first threshold. Each download request is marked with a marker at a corresponding coordinate in a map. The map is divided into a plurality of rectangles having a same area. The set of coordinates (i.e. the number of coordinates) in each rectangle is obtained such that a set of second numbers is obtained. The number of numbers in the set of second numbers is greater than a second threshold and the maximum number in the set of second numbers are then obtained. The first resource is determined as having a maliciously-boosted traffic amount, if the number of numbers which are greater than the second threshold, is greater than a third threshold or the maximum number is greater than a fourth threshold. Otherwise, the first resource is determined as not having a maliciously-boosted traffic amount.

Alternatively, the processing unit 402 is specifically configured for analyzing the boost-traffic resource to determine whether the boost-traffic resource is an accurate search for the search keyword, and ignoring the boost-traffic resource if the boost-traffic resource is an inaccurate search of the search keyword.

Alternatively, the processing unit 402 is specifically configured for the following actions/operations. The first number of multiple download requests of the first resource in a set period is obtained. Coordinates for the multiple download requests in a map is obtained if the first number is greater than a first threshold. Each download request is marked with a marker at a corresponding coordinate in a map. A screenshot processing is performed for the map to obtain a schematic diagram of a first image shown in FIG. 2b. An identification processing is performed for the first image in the FIG. 3b to obtain pixel locations of the markers in the first image. A set of pixel locations of marker A and a set of pixel locations of marker B are obtained. If the set of pixel locations of marker A has at least n pixel locations same with that in the set of pixel locations of marker B, the marker A is determined to be overlapped with the marker B. The coordinate A of the marker A is connected with the coordinate B to form a line segment (i.e. the line segment Y shown in FIG. 3b). If the length of the line segment is less than a length threshold, a range of a circle having the center point of the line segment as the center and the length of the line segment as diameter is determined as a basic abnormal range (if the length of the line segment is greater than the length threshold, the line segment is removed). The markers in the first image are processed to obtain a plurality of basic abnormal ranges. The basic abnormal ranges with overlapping areas are combined to obtain a combined abnormal range. That is, the basic abnormal ranges overlapped with each other are combined. The total area of the combined abnormal range is obtained. If the total area is greater than an area threshold, the first resource is determined as the boost-traffic resource.

Alternatively, the processing unit 402 is specifically configured for the following actions/operations. The first number of multiple download requests of the first resource in a set period is obtained. If the first number is greater than a first threshold, terminal identifiers for multiple download requests are obtained. A traffic amount of the first resource for each terminal identifier is obtained such that a set of third numbers is obtained, and the second number of numbers greater than a fifth threshold in the set of third numbers is obtained. If the second number of numbers is greater than a sixth threshold, the first resource is determined as the boost-traffic resource.

Figure 6:
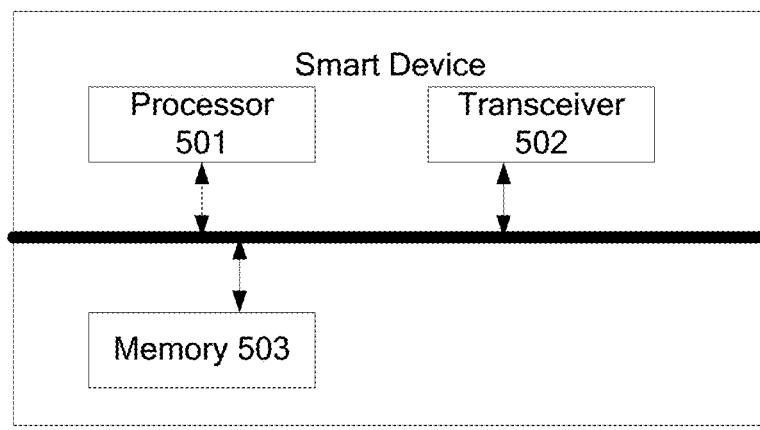
FIG. 6 is a flow chart of a smart device according to embodiments of the present disclosure.

FIG. 6 illustrates a smart device. The device comprises one or more processors 501, a memory 503, a transceiver 502, and one or more programs, the one or more programs are stored in the memory 503 and configured to be executed by the one or more processors, and the program comprises instructions for performing a method in FIG. 2.

The processor 501 can be a processor or a controller, and can be, for example, a central processing unit (CPU), a general-purpose processor, a digital signal processor (DSP), an application-specific integrated circuit (ASIC), a Field Programmable Gate Array (FPGA) or other programmable logic device, a transistor logic device, hardware components, or any combination thereof. It may implement or carry out various illustrative logical blocks, modules, and circuits described in connection with the present disclosure. The processor may also be a combination of computing functions, for example, a combination including one or more microprocessor, a combination of the DSP and a microprocessor, and the like. The transceiver 502 can be a communication interface, a transceiver, a transceiver circuit, etc., wherein the communication interface is a collective name and can include one or more interfaces.

Figure 7:
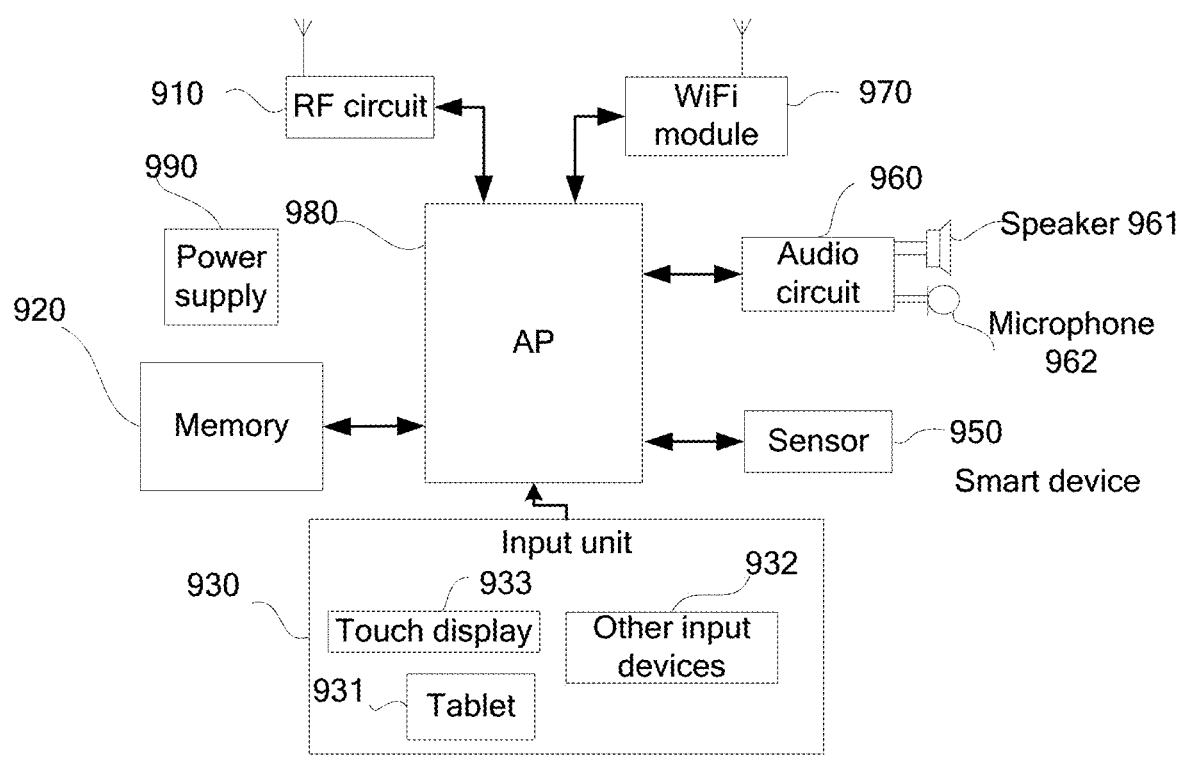
FIG. 7 is a flow chart of another smart device according to embodiments of the present disclosure.

FIG. 7 is a block diagram showing a partial structure of the smart device being a server according to an embodiment of the present disclosure. As shown in FIG. 7, the mobile phone includes a radio frequency (RF) circuit 910, a memory 920, an input unit 930, a sensor 950, an audio circuit 960, a wireless fidelity (Wi-Fi) module 970, an application processor (AP) 980, and a power supply 990. It will be understood by those skilled in the art that the structure of the mobile phone as shown in FIG. 7 does not constitute a limitation to the smart device, and may include more or less components than those illustrated, or some components may be combined, or different component arrangements.

The components of the smart device will be described in detail with reference to FIG. 7 in the following.

The input unit 930 may be configured to receive input digital or character information and generate key signal input associated with user setting and functional control of the mobile phone. Specifically, the input unit 930 can include a touch display 933, a tablet 931, and other input devices 932. The input unit 930 may also include other input devices 932. Specifically, the other input devices 932 may include, but not limited to, one or more of a physical keyboard, a functional key (such as a volume control key and a switch key), a track ball, a mouse, an operating rod, etc.

The AP 980 is a control center of the mobile phone, which is connected to all parts of the mobile phone by utilizing various interfaces and lines, and executes various functions and processing data of the smart device by running or executing the software program and/or the module stored in the memory 920 and calling data stored in the memory 920. Thus, it wholly monitors the smart device. Optionally, the AP 980 may include one or more processing units. The AP 980 may be integrated with an application processor and a modulation-demodulation processor. The application processor mainly processes an operation system, a user interface, an application program and the like, and the modulation-demodulation processor mainly processes wireless communication. It will be appreciated that the above described modulation-demodulation processor may also not be integrated into the processor 980.

Further, the memory 920 may include a high-speed RAM, and may further include a non-volatile memory such as at least one of a disk storage device, a flash device, or other non-volatile solid storage devices.

The RF circuit 910 can be used for receiving and emitting information. Usually, the RF circuit 910 includes, but not limited to, an antenna, at least one amplifier, a transceiver, a coupler, a Low Noise Amplifier (LNA), a duplexer and so on. In addition, the RF circuit 910 may further communicate with other devices via wireless communication and a network. The above wireless communication may use any communication standard or protocol, including but not limited to Global System of Mobile communication (GSM), General Packet Radio Service (GPRS), Code Division Multiple Access (Code Division), Multiple Access (CDMA), Wideband Code Division Multiple Access (WCDMA), Long Term Evolution (LTE), E-mail, Short Messaging Service (SMS), and the like.

The RF circuit 910 is configured for receiving a search request sent from the terminal. The search request includes a search keyword.

The AP 980 is configured for searching a set of resources corresponding to the search keyword, analyzing each in the set of resources to determine which in the set of resources is a boost-traffic resource and an un-boost-traffic resource; obtaining a total traffic amount of the un-boost-traffic resource, obtaining an adjusted traffic amount of the boost-traffic resource, determining a recommendation strategy of the set of resources according to the total traffic amount of the un-boost-traffic resource and the adjusted traffic amount of the boost-traffic resource, and sending the set of resources to the terminal according to the recommendation strategy.

Alternatively, the AP 980 is specifically configured for obtaining first resource from the set of resources, determining a first resource as a boost-traffic resource if the first resource has a traffic amount maliciously-boosted in a set duration, and otherwise, determining the first resource as an un-boost-traffic resource if the first resource has a traffic amount maliciously un-boosted in the set period.

Alternatively, the AP 980 is specifically configured for the following actions/operations. The first number of multiple download requests of the first resource in a set period is obtained. Coordinates for the multiple download requests in a map is obtained if the first number is greater than a first threshold. Each download request is marked with a marker at a corresponding coordinate in a map. The map is divided into a plurality of rectangles having a same area. The set of coordinates (i.e. the number of coordinates) in each rectangle is obtained such that a set of second numbers is obtained. The number of numbers in the set of second numbers is greater than a second threshold and the maximum number in the set of second numbers are then obtained. The first resource is determined as having a maliciously-boosted traffic amount, if the number of numbers which are greater than the second threshold, is greater than a third threshold or the maximum number is greater than a fourth threshold. Otherwise, the first resource is determined as not having a maliciously-boosted traffic amount.

Alternatively, the AP 980 is specifically configured for analyzing the boost-traffic resource to determine whether the boost-traffic resource is an accurate search for the search keyword, and ignoring the boost-traffic resource if the boost-traffic resource is an inaccurate search of the search keyword.

Alternatively, the AP 980 is specifically configured for the following actions/operations. The first number of multiple download requests of the first resource in a set period is obtained. Coordinates for the multiple download requests in a map is obtained if the first number is greater than a first threshold. Each download request is marked with a marker at a corresponding coordinate in a map. A screenshot processing is performed for the map to obtain a schematic diagram of a first image shown in FIG. 2b. An identification processing is performed for the first image in the FIG. 3b to obtain pixel locations of the markers in the first image. A set of pixel locations of marker A and a set of pixel locations of marker B are obtained. If the set of pixel locations of marker A has at least n pixel locations same with that in the set of pixel locations of marker B, the marker A is determined to be overlapped with the marker B. The coordinate A of the marker A is connected with the coordinate B to form a line segment (i.e. the line segment Y shown in FIG. 3b). If the length of the line segment is less than a length threshold, a range of a circle having the center point of the line segment as the center and the length of the line segment as diameter is determined as a basic abnormal range (if the length of the line segment is greater than the length threshold, the line segment is removed). The markers in the first image are processed to obtain a plurality of basic abnormal ranges. The basic abnormal ranges with overlapping areas are combined to obtain a combined abnormal range. That is, the basic abnormal ranges overlapped with each other are combined. The total area of the combined abnormal range is obtained. If the total area is greater than an area threshold, the first resource is determined as the boost-traffic resource.

The smart device may also include at least one type of sensor 950, such as a light sensor, motion sensor, and other sensors. Specifically, the light sensor may include an ambient light sensor and a proximity sensor, wherein the ambient light sensor may adjust the brightness of the display screen 941 according to the brightness of the ambient light, and the proximity sensor may turn off the display screen 941 and/or backlight when the mobile phone is moved to the ear. As a motion sensor, the accelerometer sensor can detect the magnitude of acceleration in all directions (usually three axes). When it is stationary, it can detect the magnitude and direction of gravity, which can be used to identify the gesture of the mobile phone (such as horizontal and vertical screen switching, related games, magnetometer attitude calibration), vibration recognition related functions (such as pedometer, tapping), etc. Other sensors such as gyroscopes, barometers, hygrometers, thermometers, infrared sensors can be configured in the smart device, which are no longer described herein.

An audio circuit 960, a speaker 961 and a microphone 962 may provide an audio interface between the user and the mobile phone. The audio circuit 960 can convert the received audio data to the electrical data and then emit to the speaker 961. The speaker 961 then converts to the sound signal. On the other hand, the microphone 962 converts the collected sound signal into an electrical signal. The audio circuit 960 receives the electrical signal and then convert it into audio data. The AP 980 processes the audio data and then transmits another mobile phone via the RF circuit 910, or transmits to the memory 920 for further processing.

Wi-Fi belongs to a short-range wireless transmission technology. The smart device may assist the user to receive and send e-mails, webpage browsing, access to streaming media and the like by means of the Wi-Fi module 970, which provides a wireless wideband internet access for the user. Although the Wi-Fi module 970 is illustrated in FIG. 7, it may be understood that, it may be optional components of the mobile phone and may totally be omitted without changing the essence of the present disclosure as claimed.

The mobile phone also includes a power supply 990 (such as a battery) that supplies power to the various components. Preferably, the power supply can be logically coupled to the AP 980 through a power management system to manage functions such as charging, discharging, and power management through the power management system.

In the foregoing embodiment shown in FIG. 2, each actions/operation of the method can be implemented based on the structure of the smart device.

In the foregoing embodiments shown in FIG. 5 or 5, each unit function can be implemented based on the structure of the device.

A computer storage medium is further provided in embodiments of the present disclosure. The computer storage medium stores computer programs for electronic data exchange. The computer programs cause a computer to perform some or all of the actions of any of the methods for search resource recommendation described in the foregoing embodiments. The above computer includes a mobile terminal.

A computer program product is provided in embodiments of the present disclosure. The computer program product includes a non-transitory computer readable storage medium storing a computer program. The computer programs cause a computer to perform some or all of the actions of any of the methods for search resource recommendation described in the foregoing embodiments.

It should be noted that, for the foregoing method embodiments, for the sake of brevity, they are all described as a series of action combinations, but those skilled in the art should understand that the present disclosure is not limited by the described action sequence. Because certain steps may be performed in other sequences or concurrently in accordance with the present disclosure. In the following, those skilled in the art should also understand that the embodiments described in the specification are all preferred embodiments, and the actions and modules involved are not necessarily required by the present disclosure.

In the above embodiments, the descriptions of the various embodiments are all focused on, and the parts that are not detailed in a certain embodiment can be referred to the related descriptions of other embodiments.

In several embodiments provided herein, it should be understood that the disclosed apparatus may be implemented in other ways. For example, the device embodiments described above are merely illustrative. For example, the division of the above units is only a logical function division. In actual implementation, there may be another division manner. For example, multiple units or components may be combined or integrated to another system, or some features can be ignored or not executed. In addition, the mutual coupling or direct coupling or communication connection shown or discussed may be an indirect coupling or communication connection through some interface, device or unit, and may be electrical or otherwise.

The units described above as separate components may or may not be physically separated, and the components illustrated as units may or may not be physical units, which may be located in one place, or may be distributed to multiple network units. Some or all of the units may be selected according to actual needs to achieve the purpose of the solution of the embodiment.

In addition, each functional unit in each embodiment of the present disclosure may be integrated into one processing unit, or each unit may exist physically separately. Alternatively, two or more units may also be integrated into one unit. The above integrated unit can be implemented in the form of hardware or in the form of a software functional unit.

The above-described integrated unit can be stored in a computer readable memory if it is implemented in the form of a software functional unit and sold or used as a standalone product. Based on such understanding, the technical solution of the present disclosure, in essence or the contribution to the prior art, or all or part of the technical solution may be embodied in the form of a software product. The software product is stored in a memory, which includes a number of instructions causing a computer device (which may be a personal computer, server or network device, etc.) to perform all or part of the actions of the above-described methods of various embodiments of the present disclosure. The foregoing memory includes a U disk, a Read-Only Memory (ROM), a Random Access Memory (RAM), a removable hard disk, a magnetic disk, or an optical disk, and the like, which can store program codes.

One of ordinary skill in the art can understand that all or part of the various methods of the above embodiments can be completed by related hardware instructed by a program. The program can be stored in a computer readable memory, and the memory can include a flash drive, read-only memory (ROM), random access memory (RAM), disk or CD.

The embodiments of the present disclosure have been described in detail above, and the principles and implementations of the present disclosure are described in the specific examples. The description of the above embodiments is only used to help understand the method of the present disclosure and its core ideas. For a person skilled in the art, there will have a change in the specific embodiments and the scope of present disclosure according to the idea of the present disclosure. In summary, the content of the present specification should not be construed as limiting the present disclosure.

What is claimed is:

1. A method for search resource recommendation, comprising:
   receiving a search request sent from a terminal, wherein the search request comprises a search keyword;
   searching a set of resources corresponding to the search keyword and analyzing each resource in the set of resources to determine which resource in the set of resources is a boost-traffic resource and determine which resource is an un-boost-traffic resource, wherein the boost-traffic resource is a resource having a traffic amount maliciously boosted in a set duration, and the un-boost-traffic resource is a resource having a normal traffic amount; and obtaining a total traffic amount of the un-boost-traffic resource and an adjusted traffic amount of the boost-traffic resource, determining a recommendation strategy of the set of resources according to the total traffic amount of the un-boost-traffic resource and the adjusted traffic amount of the boost-traffic resource, and sending the set of resources to the terminal according to the recommendation strategy, wherein the recommendation strategy comprises one or any combinations of a strategy of arranging according to a traffic amount, a strategy of arranging according to both a traffic amount and a click amount and a strategy of shielding.

2. The method of claim 1, wherein the analyzing the each resource in the set of resources to determine which resource in the set of resources is the boost-traffic resource and determine which resource is the un-boost-traffic resource comprises:

obtaining a first resource from the set of resources, and determining whether the first resource is the boost-traffic resource.

3. The method of claim 2, wherein the determining whether the first resource is the boost-traffic resource comprises:

obtaining a first number of download requests of the first resource in the set duration, wherein the download requests of the first resource is distributed in a map;

obtaining coordinates of the download requests in the map in response to the first number being greater than a first threshold, wherein each of the coordinates is marked with a marker in the map, and the map is divided into a plurality of rectangles having a same area;

obtaining a second number of coordinates in each rectangle such that a set of second numbers is obtained; and obtaining a third number of the second numbers in the set of second numbers greater than a second threshold and the maximum number in the set of second numbers;

wherein the first resource is determined as the boost-traffic resource in response to the third number being greater than a third threshold or the maximum number being greater than a fourth threshold; and the first resource is determined as the boost-traffic resource in response to the third number not being greater than the third threshold or the maximum number not being greater than the fourth threshold.

4. The method of claim 2, wherein the determining whether the first resource is the boost-traffic resource comprises:

obtaining a first number of download requests of the first resource in the set duration;

obtaining terminal identifiers for the download requests in response to the first number being greater than a first threshold;

obtaining a traffic amount of the first resource for each terminal identifier such that a set of second numbers is obtained;

obtaining a third number of the second numbers in the set of second numbers greater than a fifth threshold;

wherein the first resource is determined as the boost-traffic resource in response to the third number being greater than a sixth threshold; and the first resource is determined as the un-boost-traffic resource in response to the third number being not greater than the sixth threshold.

5. The method of claim 2, wherein the determining whether the first resource is the boost-traffic resource comprises:

obtaining a first number of download requests of the first resource in the set duration, wherein the download requests of the first resource is distributed in a map;

obtaining coordinates of the download requests in the map in response to the first number being greater than a first threshold, wherein each of the coordinates is marked with a marker in the map, and the map is shot to obtain a first image;

determining a basic abnormal range for any two markers in the first image, wherein one marker of the two marker has at least n pixel locations same with that of the other marker, and the basic abnormal range is a circle having a center being a center point of a line segment between the two markers and a diameter being a length of the line segment, wherein the length of the line segment is less than a length threshold;

combining basic abnormal ranges overlapped with each other to obtain a combined abnormal range; and obtaining a total area of the combined abnormal range;

wherein the first resource is determined as the boost-traffic resource in response to the total area being greater than an area threshold.

6. The method of claim 1, wherein the determining the recommendation strategy of the set of resources according to the total traffic amount of the un-boost-traffic resource and the adjusted traffic amount of the boost-traffic resource further comprises:

analyzing the boost-traffic resource to determine whether the boost-traffic resource is an accurate search for the search keyword; and determining the recommendation strategy of the boost-traffic resource as ignoring the boost-traffic resource in response to the boost-traffic resource not being the accurate search for the search keyword.

7. The method of claim 6, wherein the determining the recommendation strategy of the boost-traffic resource as ignoring the boost-traffic resource comprises:

shielding the boost-traffic resource.

8. The method of claim 1, wherein $x=k*(y-z)$, wherein x is the adjusted traffic amount of the boost-traffic resource, y is a total traffic amount of the boost-traffic resource, z is a maliciously-boosted traffic amount of the boost-traffic resource, k is a set coefficient, and a value of k is greater than 0 and less than or equal to 1.

9. A smart device comprising a non-transitory memory storing one or more programs, a transceiver, and a processor, wherein when the one or more programs causing the processor to perform:

searching a set of resources corresponding to a search keyword and analyzing each resource in the set of resources to determine which resource in the set of resources is a boost-traffic resource and determine which resource is an un-boost-traffic resource, wherein the boost-traffic resource is a resource having a traffic amount maliciously boosted in a set duration, and the un-boost-traffic resource is a resource having a normal traffic amount; and obtaining a total traffic amount of the un-boost-traffic resource and an adjusted traffic amount of the boost-traffic resource, determining a recommendation strategy of the set of resources according to the total traffic amount of the un-boost-traffic resource and the adjusted traffic amount of the boost-traffic resource to recommend the set of resources according to the recommendation strategy, wherein the recommendation strategy comprises one or any combinations of a strategy of arranging according to a traffic amount, a strategy of arranging according to both a traffic amount and a click amount and a strategy of shielding.

10. The smart device of claim 9, wherein the analyzing the each resource in the set of resources to determine which resource in the set of resources is the boost-traffic resource and determine which resource is the un-boost-traffic resource comprises:
   obtaining a first resource from the set of resources and a first number of download requests of the first resource in the set duration, wherein the download requests of the first resource is distributed in a map;
   obtaining coordinates of the download requests in the map in response to the first number being greater than a first threshold, wherein each of the coordinates is marked with a marker in the map, and the map is divided into a plurality of rectangles having a same area;
   obtaining a second number of coordinates in each rectangle such that a set of second numbers is obtained;
   obtaining a third number of the second numbers in the set of second numbers greater than a second threshold and the maximum number in the set of second numbers;
   determining the first resource as the boost-traffic resource in response to the third number being greater than a third threshold or the maximum number being greater a fourth threshold; and
   determining the first resource as the boost-traffic resource in response to the third number not being greater than the third threshold or the maximum number not being greater than the fourth threshold.

11. The smart device of claim 9, wherein the analyzing the each resource in the set of resources to determine which resource in the set of resources is the boost-traffic resource and determine which resource is the un-boost-traffic resource comprises:
   obtaining a first resource from the set of resources and a first number of download requests of the first resource in the set duration;
   obtaining terminal identifiers for the download requests in response to the first number being greater than a first threshold;
   obtaining a traffic amount of the first resource for each terminal identifier such that a set of second numbers is obtained;
   obtaining a third number of the second numbers in the set of second numbers greater than a fifth threshold;
   determining the first resource as the boost-traffic resource in response to the third number being greater than a sixth threshold; and
   determining the first resource as the un-boost-traffic resource in response to the third number being not greater than the sixth threshold.

12. The smart device of claim 9, wherein the analyzing the each resource in the set of resources to determine which resource in the set of resources is the boost-traffic resource and determine which resource is the un-boost-traffic resource comprises:
   obtaining a first resource from the set of resources and a first number of download requests of the first resource in the set duration, wherein the download requests of the first resource is distributed in a map;
   obtaining coordinates of the download requests in the map in response to the first number being greater than a first threshold, wherein each of the coordinates is marked with a marker in the map, and the map is shot to obtain a first image;
   determining a basic abnormal range for any two markers in the first image, wherein one marker of the two marker has at least n pixel locations same with that of the other marker, and the basic abnormal range is a circle having a center being a center point of a line segment between the two markers and a diameter being a length of the line segment, wherein the length of the line segment is less than a length threshold;
   combining basic abnormal ranges overlapped with each other to obtain a combined abnormal range;
   obtaining a total area of the combined abnormal range; and
   determining the first resource as the boost-traffic resource in response to the total area being greater than an area threshold.

13. The smart device of claim 9, wherein the determining the recommendation strategy of the set of resources according to the total traffic amount of the un-boost-traffic resource and the adjusted traffic amount of the boost-traffic resource further comprises:
   determining whether the boost-traffic resource is an accurate search for the search keyword; and
   determining the recommendation strategy of the boost-traffic resource as shielding the boost-traffic resource in response to the boost-traffic resource not being the accurate search for the search keyword.

14. The smart device of claim 9, wherein $x=k*(y-z)$, wherein x is the adjusted traffic amount of the boost-traffic resource, y is a total traffic amount of the boost-traffic resource, z is a maliciously-boosted traffic amount of the boost-traffic resource, k is a set coefficient, and a value of k is greater than 0 and less than or equal to 1.

15. A non-transitory storage medium storing a plurality of instructions, which when executed causing a processor to perform:
   searching a set of resources corresponding to a search keyword and analyzing each resource in the set of resources to determine which resource in the set of resources is a boost-traffic resource and determine which resource is an un-boost-traffic resource, wherein the boost-traffic resource is a resource having a traffic amount maliciously boosted in a set duration, and the un-boost-traffic resource is a resource having a normal traffic amount; and
   obtaining a total traffic amount of the un-boost-traffic resource and an adjusted traffic amount of the boost-traffic resource, determining a recommendation strategy of the set of resources according to the total traffic amount of the un-boost-traffic resource and the adjusted traffic amount of the boost-traffic resource to recommend the set of resources according to the recommendation strategy, wherein the recommendation strategy comprises one or any combinations of a strategy of arranging according to a traffic amount, a strategy of arranging according to both a traffic amount and a click amount and a strategy of shielding.

16. The non-transitory storage medium of claim 15, wherein the analyzing the each resource in the set of resources to determine which resource in the set of resources is the boost-traffic resource and determine which resource is the un-boost-traffic resource comprises:

obtaining a first resource from the set of resources and a first number of download requests of the first resource in the set duration, wherein the download requests of the first resource is distributed in a map;

obtaining coordinates of the download requests in the map in response to the first number being greater than a first threshold, wherein each of the coordinates is marked with a marker in the map, and the map is divided into a plurality of rectangles having a same area;

obtaining a second number of coordinates in each rectangle such that a set of second numbers is obtained;

obtaining a third number of the second numbers in the set of second numbers greater than a second threshold and the maximum number in the set of second numbers;

determining the first resource as the boost-traffic resource in response to the third number being greater than a third threshold or the maximum number being greater a fourth threshold; and determining the first resource as the boost-traffic resource in response to the third number not being greater than the third threshold or the maximum number not being greater than the fourth threshold.

17. The non-transitory storage medium of claim 15, wherein the analyzing the each resource in the set of resources to determine which resource in the set of resources is a boost-traffic resource and determine which resource is an un-boost-traffic resource comprises:

obtaining a first resource from the set of resources and a first number of download requests of the first resource in the set duration;

obtaining terminal identifiers for the download requests in response to the first number being greater than a first threshold;

obtaining a traffic amount of the first resource for each terminal identifier such that a set of second numbers is obtained;

obtaining a third number of the second numbers in the set of second numbers greater than a fifth threshold;

determining the first resource as the boost-traffic resource in response to the third number being greater than a sixth threshold; and determining the first resource as the un-boost-traffic resource in response to the third number being not greater than the sixth threshold.

18. The non-transitory storage medium of claim 15, wherein the analyzing the each resource in the set of resources to determine which resource in the set of resources is the boost-traffic resource and determine which resource is the un-boost-traffic resource comprises:

obtaining a first resource from the set of resources and a first number of download requests of the first resource in the set duration, wherein the download requests of the first resource is distributed in a map;

obtaining coordinates of the download requests in the map in response to the first number being greater than a first threshold, wherein each of the coordinates is marked with a marker in the map, and the map is shot to obtain a first image;

determining a basic abnormal range for any two markers in the first image, wherein one marker of the two markers has at least n pixel locations same with that of the other marker, and the basic abnormal range is a circle having a center being a center point of a line segment between the two markers and a diameter being a length of the line segment, wherein the length of the line segment is less than a length threshold;

combining basic abnormal ranges overlapped with each other to obtain a combined abnormal range;

obtaining a total area of the combined abnormal range; and determining the first resource as the boost-traffic resource in response to the total area being greater than an area threshold.

* * * * *